United States Patent [19]

Takarada

[11] 3,870,902

[45] Mar. 11, 1975

[54] BUFFER CIRCUIT FOR PULSE TRANSMISSION

[76] Inventor: Eiichi Takarada, 1423 Vassar Rd., Rockford, Ill. 61103

[22] Filed: Nov. 6, 1973

[21] Appl. No.: 413,213

[52] U.S. Cl. .......... 307/247, 307/254

[51] Int. Cl. .......... H03k 17/00

[58] Field of Search .......... 328/195, 55, 196, 58; 307/247, 272, 171, 270; 315/227 R; 204/224 M, 141.5, 129.4

[56] References Cited

UNITED STATES PATENTS

| | | | |
|---|---|---|---|
| 2,794,123 | 5/1957 | Younker | 328/58 |
| 2,931,981 | 4/1960 | Schabauer | 328/55 |
| 2,932,795 | 4/1960 | Carroll | 328/196 |
| 3,132,260 | 5/1964 | Gunderson et al. | 328/195 |
| 3,204,128 | 8/1965 | Petersen | 307/247 |
| 3,519,849 | 7/1970 | Tyler | 307/247 X |
| 3,728,558 | 4/1973 | Genuit et al. | 307/247 X |

*Primary Examiner*—Michael J. Lynch
*Assistant Examiner*—B. P. Davis

[57] ABSTRACT

A buffer circuit for regenerating the output waveform of an adjustable pulse generator and for coupling that regenerated waveform to one or more power switch drivers in an EDM power supply or the like. The circuit electrically isolates the pulse generator circuit from the power switch driver circuit while assuring that the control signal for each driver is an accurate reproduction of the pulse generator output. This electrical isolation not only inhibits feedback of transients from the power switch circuitry, but allows the power switches to be operated at any DC level, independently of the DC level of the pulse generator or other logic circuitry. These results are achieved by utilizing capacitively coupled electronic switches for detecting the leading and trailing edges of the pulse generator waveform and inductively coupling the electronic switch signals to the inputs of one or more flip-flops. The output of each flip-flop, which thereby corresponds to the pulse generator waveform, is used as a control signal for a power switch driver. A machine operator may thereby accurately control the on-time and off-time of a plurality of power switches by merely adjusting the pulse generator.

4 Claims, 3 Drawing Figures

BUFFER CIRCUIT FOR PULSE TRANSMISSION

This invention generally relates to electrical discharge machining, that is, the machining of metal or other conductive materials by the utilization of electrical discharge between a workpiece and a tool electrode. More specifically, the invention relates to improvements in the power supply for such a device wherein the spark on and off times are accurately controlled.

In electrical discharge machining, which is sometimes referred to as spark machining or electro-erosion, particles are dislodged from a conductive workpiece by electrical discharges or sparks which are passed through an ionized gap which is defined between a shaped electrode tool and an electrically conductive workpiece. The general rule is that each discharge will occur between the most closely spaced electrode and workpiece points and, therefore, to obtain the desired machined configuration for the workpiece, one or more electrodes, each shaped to contribute to the formation of a complementary configuration, are successively employed. The size of the particles dislodged by each discharge, and consequently the surface finish obtained, is dependent upon the composition of the workpiece and the energy content of the discharge. Provision is therefore generally made to control the discharge energy, such as by varying one or more of the discharge repetition rate, duty cycle, and current.

Both single-lead and multi-lead EDM systems are in use today. A single-lead system is characterized by a single electrode thereby providing only one ionizable gap. A multi-lead system, however, utilizes a plurality of electrodes, thereby increasing the number of ionizable gaps with a corresponding decrease in machining time. The two systems are similar in that they both employ power switches to couple the EDM power source to the electrode. As a power switch is generally required for each electrode, it is seen that a single-lead system required only a single power switch, whereas a multi-lead system requires a plurality of such switches. These switches, which are generally of the electronic type, are intermittently opened and closed to couple power from a source across the gap in a series of discrete pulses. As mentioned above, both the pulse repetition rate and duty cycle are important factors in controlling the energy content of the discharge and thereby the size of the particle dislodged by each discharge. A stable pulse generator, having an adjustable pulse repetition rate and adjustable duty cycle, is generally used as a signal source to provide this control, its output being ultimately used to drive the power switches.

Since the type of pulse generator most generally used in EDM power supplies, i.e., an astable multivibrator, is load sensitive, it is necessary to provide sufficient buffering between the pulse generator and the power switches in order to prevent load variations from affecting the selected on-time, off-time pattern. In addition, in order to prevent electrical noise generated by the discharge from affecting the operation of the multivibrator and other logic circuitry, it is necessary to electrically isolate the power switches and their high power supply from the remaining circuitry.

Certain prior art means have achieved this isolation by utilizing a pulse transformer to couple the pulse generator output to the input of the power switch drivers. While this approach provides the necessary isolation, it is not completely satisfactory in that, under certain conditions, the pulse generator waveform cannot be accurately coupled to the power switch drivers. More specifically, not only does the transformer limit the rise time of the output pulse, but the hysteresis inherent in the transformer limits the range of duty cycle available. Other prior art means have utilized opto-isolation techniques such as a photodiode driven by the pulse generator which is optically coupled to a phototransistor whose output controls the power switch drivers. However, these means are generally limited in speed, with speed improvements available only at the expense of noise immunity. In addition to these shortcomings, in multi-lead systems, the drivers which must be interposed between the isolating means and the power switches may tend to distort the waveform even further.

With the foregoing in mind, it is the general aim of the present invention to provide an EDM power supply wherein the pulse generator waveform accurately controls the on-time and off-time of the power switches. More specifically, it is an object of the invention to provide a buffer circuit for isolating the pulse generator circuit from the power switch circuit which is capable of accurately regenerating the output waveform of the pulse generator. It is a further object to provide a buffer circuit having enhanced speed and duty cycle capabilities.

As a more detailed object, it is intended to provide a buffer circuit of the foregoing type wherein the leading and trailing edges of the pulse generator waveform are detected and coupled to the inputs of a flip-flop in an electrically isolated circuit, the flip-flop regenerating the original waveform for coupling to a power switch driver. A further object is to increase the drive capability of the pulse generator in a multi-lead EDM system without distorting its output waveform. As a still further object of the invention it is intended to provide a buffer circuit for use in a multi-lead EDM system having a plurality of transformer driven flip-flops, each capable of accurately reproducing the output waveform of the pulse generator.

These and other objects and advantages of the invention will become apparent from the following detailed description taken in conjunction with the accompanying drawings, in which.

While the invention will be described in connection with certain illustrated embodiments, it will be understood that there is no intent to limit it to those embodiments. To the contrary, the intent is to cover all alternatives, modifications and equivalents as may be included within the spirit and scope of the invention as defined by the appended claims.

Figure 1:
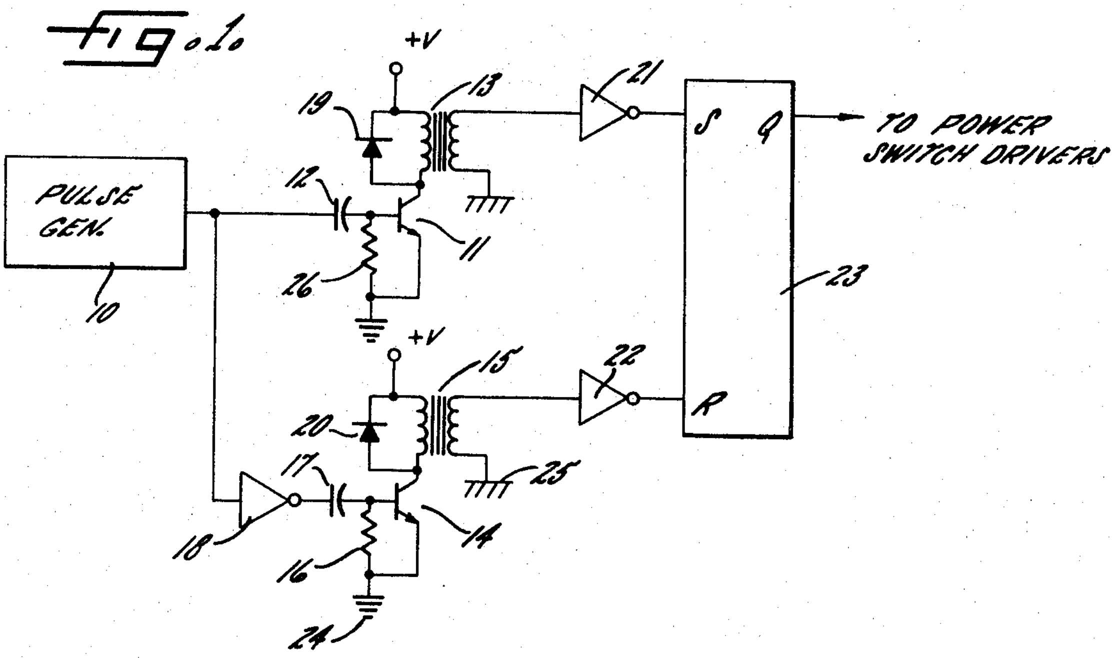
FIG. 1 is a circuit diagram illustrating a buffer circuit for use with a single-lead power supply.

Turning now to the drawings, and particularly to FIG. 1, there is illustrated a portion of a single lead EDM power supply. A pulse train, which may be variable both in frequency and duty cycle, is provided by pulse generator 10, a typical output waveform being illustrated in FIG. 3 at 30. The period T, the time between corresponding portions of succeeding pulses, is adjustable to yield a pulse repetition rate which can vary between, say, 500 Hz and 200 kHz. The duty cycle, which may be described as the percentage of a period occupied by the high portion of a pulse, is also variable between approximately 5 and 95 percent. A pulse train or waveform of the type illustrated may be used to control the power switches in an EDM power supply, such as by causing the switches to conduct during the high portions and blocking conduction during the low portions of the pulse train. In order to utilize the fine control over the waveform provided by the pulse generator, it is necessary that the buffer circuitry, which couples the pulses to the power switch drivers, accomplish its function with a minimum of pulse distortion. More specifically, both the pulse repetition rate and pulse width should be accurately maintained; in addition the pulse rise and fall time should be made as fast as possible.

In accordance with the teachings of the invention, this is accomplished by detecting the leading and trailing edges of the pulses in the pulse generator output signal, and driving a flip-flop in response to those detected edges, thereby causing the flip-flop to accurately reproduce the pulse generator waveform. The flip-flop associated its associaated power switch driver is electrically isolated from the pulse generator and other control circuitry, the driving signals being coupled to the flip-flop by respective pulse transformers. This allows the power switches to control a source of power which may be at a different DC level completely independent of the pulse generator circuitry.

Referring again to FIG. 1, grounded emitter transistor 11 has its base or input circuit coupled via a capacitor 12 to the output of the pulse generator 10. The primary of a pulse transformer 13 is coupled in the load circuit of transistor 11, between a suitable supply of DC voltage and its collector. In addition, transistor 11 is provided with a resistor 26 coupled between its base and ground to act as a ground return, and a discharge path for capacitor 12. Transistor 11 is normally maintained nonconducting thereby preventing current flow through the primary of transformer 13. However, at the initiation of a positive pulse from the pulse generator 10, capacitor 12 is caused to charge through the base-emitter circuit of transistor 11, turning the transistor on and causing current flow in the primary of transformer 13. This current flow continues for only a brief time sufficient to charge capacitor 12, after which the transistor, having lost its supply of base current, again turns off. When the pulse generator signal returns to its 0 level, capacitor 12 discharges through resistor 26 without causing conduction in the transistor. Therefore, it is seen that at each leading edge of the pulse generator signal a brief pulse of current will be caused to flow through the primary of transformer 13.

Transistor 14 is arranged in a circuit similar to that of transistor 11, having the primary of a pulse transformer 15 coupled between its collector and a suitable supply of DC voltage, and having its emitter grounded. In addition it has a ground return resistor 16 coupled between its base and ground. Interposed between its coupling capacitor 17 and the pulse generator, however, is inverter 18. This inverter causes transistor 14 to "see" the complement of the signal applied to transistor 11. It should therefore be appreciated that the trailing edge of the pulses, which were ineffective to cause conduction in transistor 11, appear as leading edges to transistor 14, thereby causing it to briefly conduct. From the foregoing, it is seen that the primary of transformer 13 will experience current flow on the leading edge of a pulse while the primary of transformer 15 will experience current flow on the trailing edge of a pulse.

Diodes 19 and 20 are coupled across the primaries of transformers 13 and 15 respectively, in reverse biased fashion in order to dissipate the energy stored in the transformer upon transistor turn-off. This energy dissipation protects the transistors from the high transient voltages which might otherwise be generated by the transformers.

Referring again to FIG. 3, the voltage signals at the collectors of transistors 11 and 14 are illustrated at 31 and 32, respectively. It is seen that both collectors are normally maintained at a high voltage preventing current flow through the primary of their associated transformer. However, at $t_1$ the output of the pulse generator rises, and in response thereto the voltage at the collector of transistor 11 quickly falls, thereby causing current flow through the primary of transformer 13. It is seen that this low signal and its resultant current flow is very brief, the collector of the transistor going back high when capacitor 12 is charged, removing transistor base current. As illustrated at $t_1$, $t_3$, $t_5$ and $t_7$, a pulse is produced at each leading edge of the pulse generator waveform. The signal at the collector of transistor 14, illustrated at 32, is similar to that illustrated at 31; however, because of the interposition of inverter 18, pulses are produced at the trailing edges of the pulse generator signal. Therefore, current flow is caused in the primary of transformer 15 at $t_2$, $t_4$, $t_6$ and $t_8$.

The secondaries of transformers 13 and 15 are coupled through inverters 21 and 22 to the set and reset inputs respectively of flip-flop 23. As one side of each secondary is grounded, the lack of current flow in the primary of the transformer causes the input of the associated inverter to remain at ground or logic 0, holding its output and the corresponding flip-flop input high or at logic 1. Current flow in the secondary of a transformer, resulting from current flow in the primary, produces a high signal at the input of the associated inverter causing its output to go to a logic 0, further imposing that logic 0 on its associated flip-flop input. Thus, current flow in transformer 13 causes the flip-flop to be set, while current flow in transformer 15 causes it to be reset.

Briefly reviewing the above, it is seen that what has been accomplished is the provision of a flip-flop with its set input made responsive to leading edges of the pulse generator waveform and its reset input made responsive to trailing edges of that waveform. As the set input causes the flip-flop Q output to go high, and as the reset input causes the Q output to go low, it should be appreciated that the output of the flip-flop is an accurate reproduction of the pulse generator waveform. Referring again to FIG. 3, the flip-flop output is shown at 33. At $t_1$, in response to current flow in transformer 13 (as illustrated at 31), the set input of flip-flop 23 is driven low causing its Q output to go high. At $t_2$, in response to current flow in transformer 15 (as illustrated at 32), the reset input is driven low driving the Q output low. Comparing diagrams 33 and 30, it is seen that the output of flip-flop 23 accurately reproduces the output of pulse generator 10.

Referring again to FIG. 1, it is seen that the Q output of flip-flop 23 is coupled to the power switch drivers for controlling the power switches of the EDM supply, and that the pulse generator circuit is electrically isolated from the circuit of the power switches by transformer 13 and 15. This is illustrated by the different ground symbols used in the pulse generator circuit and the power switch circuit. More specifically, the system common for the pulse generator circuit illustrated, for example, at 24 is not coupled to the system common for the driver circuit illustrated, for example, at 25. In this way, the logic and control circuits associated with the pulse generator may be electrically isolated from the high power, high current power switch supply and its associated transients. As demonstrated above, however, this isolation is achieved without any distortion in the signal coupled to the power switch drivers. More specifically, the means by which the flip-flop 23 accurately regenerates the pulse generator waveform provides a driving source to the power switch drivers which has the same pulse repetition rate and pulse width as the signal produced by pulse generator 10. Therefore, it is seen that the accurate control which is achievable over the pulse generator is truly active upon the power switch drivers.

This control is achieved as a result of two main factors. In the first instance, the pulse transformers are required to pass only a brief pulse in response to edges of the pulse train, as opposed to prior art systems wherein they were required to pass the full pulse. The second factor is the flip-flop, which is set and reset in response to these brief edge detected pulses. The flip-flop, being an inherently fast switching device, will rapidly respond to the brief pulses passed by the pulse transformers to quickly change its output state. This output state is then held without degradation until the next succeeding set or reset pulse, independently of any control by the pulse generator. Therefore it is seen that the hysteresis of the pulse transformers is not a limiting factor as regards duty cycle. In addition, as the flip-flop will rapidly switch once its input threshold level is reached, the flip-flop output can be made somewhat insensitive to the rise time limitations of the pulse transformer.

Figure 2:
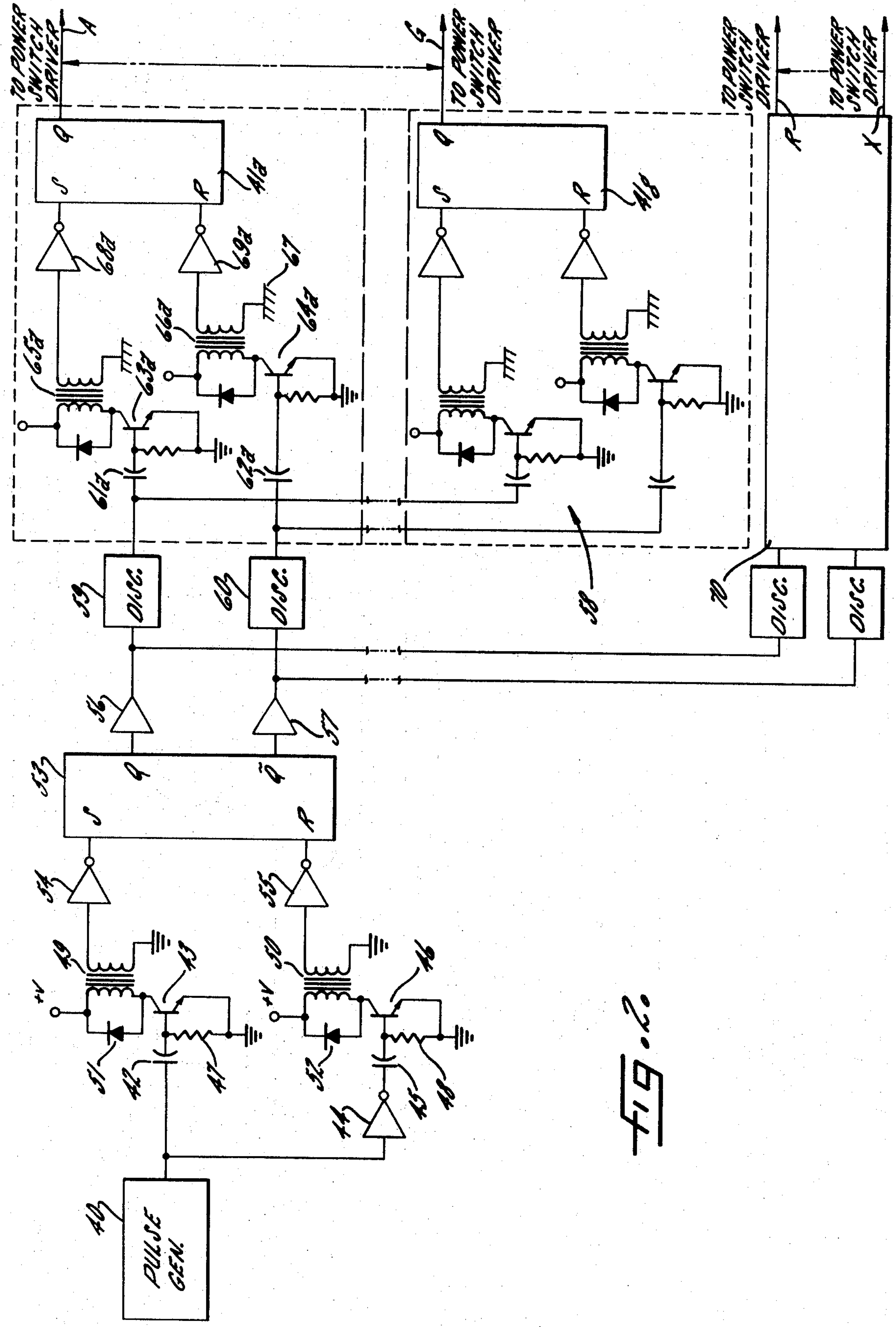
FIG. 2 is a circuit diagram illustrating a buffer circuit for use with a multi-lead power supply.

The relatively simple embodiment of the circuit, described above, can be further refined to provide a plurality of accurately regenerated pulses to drive a multi-electrode EDM system. FIG. 2, which illustrates such a system, contains a single pulse generator 40 and a plurality of output flip-flops 41*a*–41*x*. It is seen that certain of the circuitry is common to the embodiment of FIG. 1, while additional circuitry has been added to drive the plurality of output flip-flops in synchronism without degrading the pulse characteristics.

The output of pulse generator 40 is coupled via capacitor 42 to the base of transistor 43, and also via inverter 44 and capacitor 45 to the base of transistor 46. Just as in the previous embodiment, the transistors are connected in a common emitter configuration, having ground return resistors 47 and 48 in their base circuits and collector circuits including the primaries of pulse transformer 49 and 50, with energy dissipation diodes 51 and 52. As previously described, the leading edges of the pulse generator signal cause current flow in transformer 49 while the trailing edges cause current flow in transformer 50. The secondaries of transformers 49 and 50 form inputs to a circuit which may be electrically isolated from the pulse generator circuit if desired. However, as this circuit does not directly drive the power switches, it may also be driven from the same power supply as used for the pulse generator circuitry. Just as in the previously described embodiment, the secondary of transformer 49 is coupled through an inverter 54 to the set input of a flip-flop 53. Likewise, the secondary of transformer 50 is coupled via an inverter 55 to the reset input of flip-flop 53. As described above, flip-flop 53 accurately regenerates the pulse generator waveform, the regenerated signal appearing at the Q output, and its complement at the $\overline{Q}$ output. The Q and $\overline{Q}$ outputs are coupled via non-inverting drivers 56 and 57 to circuitry to be described below. These drivers are interposed so that the switching speed of flip-flop 53 can be maintained while still providing sufficient drive caapability to power the remaining circuitry.

The outputs of drivers 56 and 57 are used to drive distribution circuitry containing a plurality of substantially identical circuits for supplying drive pulses to the power switch drivers. Only a portion of this distribution circuitry, generally indicated at 58, will therefore be described in detail.

It is seen that the output of drivers 56 and 57 are coupled to the input of discriminators 59 and 60. Each differentiator is preferably a capacitively coupled emitter follower stage used to provide a high input impedance to the drivers, a low output impedance to succeeding stages and a non-inverted output. The discriminators are not illustrated in detail as they can be achieved by various means well known in the art. Suffice it to say, that each stage produces a brief positive pulse in response to the leading edge of a pulse at its input. Therefore, discriminator 59 will produce a brief positive pulse when the Q output of flip-flop 53 goes high, while discriminator 60 will produce a brief positive pulse when the $\overline{Q}$ output goes high. These brief positive pulses are coupled via capacitors 61a and 62a to the base circuits of transistors 63a and 64a respectively. Transistors 63a and 64a are each arranged in common emitter configuration having the primary of a pulse transformer 65a and 66a respectively coupled in their collector circuits. The circuit operation is similar to that of transistors 43 and 46. The secondaries of the transformers 65*a* and 66*a* form the inputs to an isolated circuit which is used to control one of a plurality of power switch drivers. The electrical isolation provided by the transformers is illustrated by the different ground symbol used, for example, at 67. Just as in the embodiment of FIG. 1, the secondaries are coupled through inverters 68a and 69a respectively to the set and reset inputs of flip-flop 41*a*.

Figure 3:
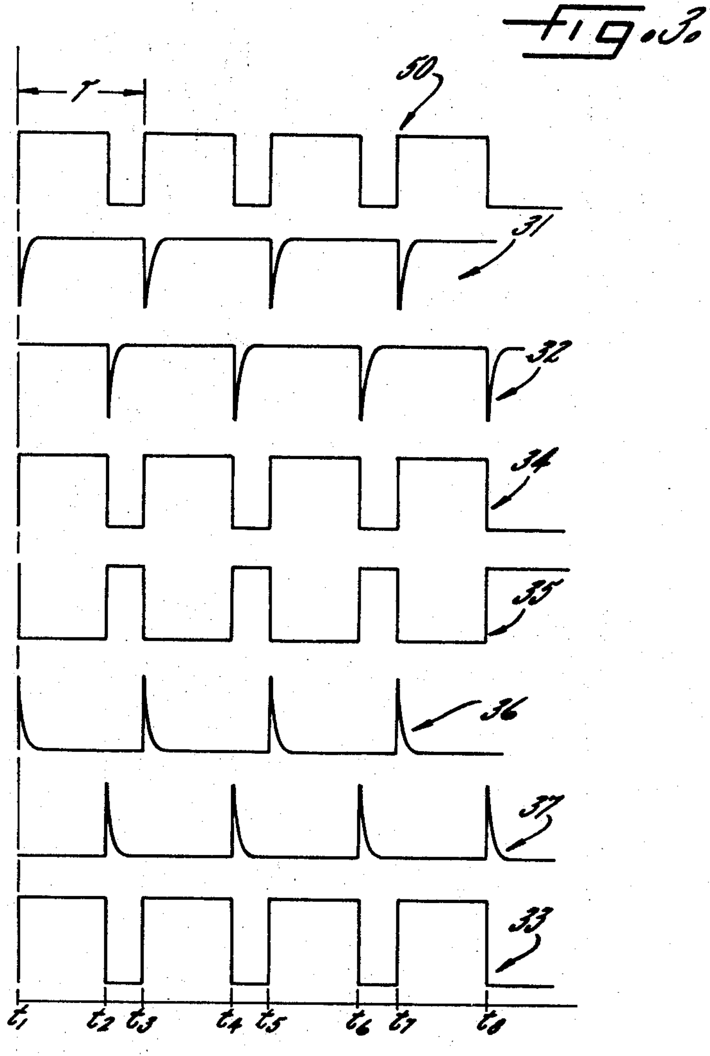
FIG. 3 is a timing diagram illustrating various wave shapes in the circuits of FIGS. 1 and 2.

The fact that the Q output of flip-flop 41*a* accurately reproduces the signal produced by pulse generator 40 will be demonstrated with reference to FIG. 3. It is recalled that the output of the pulse generator is illustrated at 30. Diagrams 31 and 32 illustrate the voltage at the collectors of transistors 43 and 46 respectively. It is seen that at $t_1$, $t_3$, $t_5$, and $t_7$ current flow is caused in the primary of transformer 49, while at $t_2$, $t_4$ $t_6$, and $t_8$ current flow is caused in transformer 50. This signal when coupled via inverters 54 and 55 to the inputs of flip-flop 53 cause the Q output to take the form illustrated at 34. It is seen that the flip-flop is set (its Q output is driven to the 1 state) in response to the pulses shown in diagram 31. Similarly, the flip-flop is reset (its Q output driven to its 0 state) in response to the pulses shown in diagram 32. Diagram 35 illustrates that the $\overline{Q}$ output of flip-flop 53 is merely the inverse of its Q output. It is recalled that these Q and $\overline{Q}$ outputs when reinforced by drivers 56 and 57 are fed to the input of discriminators 59 and 60. The outputs of these discriminators are illustrated at 36 and 37 respectively. For each leading edge of the Q output, as seen at 34, a brief positive pulse is generated by discriminator 59. Similarly, for each leading edge of the $\overline{Q}$ output, illustrated at 35, discriminator 60 emits a brief positive pulse. These brief pulses cause transistors 63*a* and 64*a* to conduct, causing current flow in transformers 65*a* and 66*a* respectively. These signals, when passed by inverters 68*a* and 69*a* cause flip-flop 41*a* to be set and reset in time with the discriminator output pulses. The output of flip-flop 41a is illustrated at 33. It is seen that each positive signal at 36 causes the flip-flop to be set thereby causing its Q output to go high, while each positive pulse at 37 causes the flip-flop to be reset causing its Q output to go low. A comparison of diagrams 33 and 30 indicates their similarity, demonstrating that the circuitry has resulted in the regeneration of the pulse train output by pulse generator 40 at the output of flip-flop 41*a*.

Referring again to FIG. 2, it is seen that the output of flip-flop 41a is used to drive power switch driver A. It is further seen that distribution circuit 58 contains a plurality of driver circuits, one of which was described above. A second identical circuit is shown having an output flip-flop 41*g* coupled to power switch driver G. It is seen that each of the output flip-flops 41a-41g produces an accurate reproduction of the pulse train emitted by pulse generator 40. What essentially is provided, therefore, is an individual pulse generator circuit for each power switch driver, all of which are controlled from the master pulse generator 40.

In addition to the output multiplication achieved by distribution circuit 58, additional distribution circuits may also be driven by drivers 56 and 57. A second of a plurality of such distribution circuits is illustrated at 70 having a pair of input discriminators and outputs to power switch drivers R–X. If still further drive capability is required, additional buffer circuits may be coupled to the output of pulse generator 40. To this end, the teachings of this invention have been applied in one embodiment to control 96 individual power switch drivers, each with its own driving flip-flop, from a single master pulse generator. In this regard, it is again emphasized that each of the driving flip-flops has an output waveform which is as sharp as the output from the pulse generator. It is further emphasized that due to the coupling techniques used and the regenerating action of the flip-flops, the output signal of each driving flip-flop is made extremely responsive to adjustment to the pulse repetition rate and/or duty cycle of the pulse generator.

In certain EDM applications it is desirable to provide feedback from the machining gap to the control circuit for the power switches. Such control might be for example used to interrupt a power pulse under a condition of short circuit in the gap. It is seen that, in accordance with the invention, as each power switch is driven from its individual flip-flop, such a feedback signal can be used to reset the individual flip-flop, without affecting the operation of any of the other flip-flops or machining gaps. Also, in certain cases it may be found desirable to interpose further circuitry, including a flip-flop, between the distribution circuitry terminating at the primary of transformer 65, and the power driver circuitry initiating at the secondary of transformer 65, for processing these control signals. This can be easily achieved without departing from the spirit and scope of the invention as disclosed.

From the foregoing it will be appreciated that what has been provided is a buffer circuit for coupling the output of a pulse generator to either one or a plurality of power switch drivers; while the two circuits are isolated, the triggering and regenerating techniques utilized provide an accurate reproduction of the pulse generator output at each of the power switch driver flip-flops. Thus, the operator of the EDM system is assured that an adjustment to either the pulse repetition rate or duty cycle made at the master pulse generator will be accurately reflected in the switching signals to the power drivers.

What is claimed is:

1. In an EDM power supply having a pulse generator and a power switch driver, a buffer circuit comprising in combination a pair of pulse transformers each having a primary and a secondary for coupling signals between the pulse generator circuit and the power switch driver circuit while maintaining their electrical isolation, a pair of electronic switches each having a control circuit and a load circuit, one of the transformer primaries coupled in the load circuit of each of the electronic switches, the first of said switches having its control circuit coupled to the pulse generator, an inverter coupled between the pulse generator and the control circuit of the second of said switches, a flip-flop having a set input coupled to the secondary of one of the other of the transformers and a reset input coupled to the secondary of the other of the transformers, the flip-flop having an output coupled to the power switch driver, whereby the signal produced by the pulse generator is regenerated by the flip-flop for controlling the electrically isolated power switch drivers.

2. The combination of claim 1 wherein the electronic switches each comprise a transistor having a collector-emitter load circuit and a base-emitter control circuit.

3. The combination of claim 2 further including a capacitor interposed in the control circuit of each electronic switch, whereby the flip-flop is made responsive to the leading and trailing edges of the pulse generator waveform.

4. In an EDM power supply having a pulse generator and a plurality of power switch drivers, a buffer circuit comprising in combination an input pair of pulse transformers each having a primary and a secondary for coupling signals between the pulse generator circuit and a distribution circuit, an input pair of electronic switches each having a control circuit and a load circuit, one of the transformer primaries coupled in the load circuit of each electronic switch, the first of said switches having its control circuit coupled to the pulse generator, an inverter coupled between the pulse generator and the control circuit of the second of said switches, a distribution circuit flip-flop having set and reset inputs and Q and $\overline{Q}$ outputs, one of said flip-flop inputs coupled in the secondary circuit of each of the input pulse transformers, at least one discriminator circuit coupled to the Q output and at least one discriminator circuit coupled to the $\overline{Q}$ output of the distribution circuit flip-flop for detecting output signal transitions of said flip-flop, a plurality of first output electronic switches each having a control circuit coupled to the output of a $\overline{Q}$ connected discriminator circuit, a corresponding plurality of second output electronic switches each having a control circuit coupled to the output of a Q connected discriminator circuit, a plurality of output pulse transformers each having a primary and a secondary for coupling signals between the distribution circuit and the power switch driver circuit while maintaining their electrical isolation, each of said first and second output switches having a load circuit including the primary of one of the output pulse transformers, a plurality of output flip-flops each having a set and reset input, each output flip-flop having one of its inputs coupled to the secondary of one of the transformers associated with one of said first output switches and its other input coupled to the secondary of one of the transformers associated with one of said second output switches, the output of each of said output flip-flops coupled to one of the power switch drivers, whereby a plurality of power switch drivers are controlled from a single pulse generator while electrically isolating the power switch driver circuit from the pulse generator circuit.

* * * * *